US007610967B2

(12) United States Patent
Fischer et al.

(10) Patent No.: US 7,610,967 B2

(45) Date of Patent: Nov. 3, 2009

(54) HAND-HELD POWER TOOL WITH A DECOUPLING DEVICE

(75) Inventors: Axel Fischer, Wiedergeltingen (DE); Roland Meuer, Ettringen (DE)

(73) Assignee: Hil Aktiengesellschaft, Schaan (LI)

( * ) Notice: Subject to any disclaimer, the term of this patent is extended or adjusted under 35 U.S.C. 154(b) by 85 days.

(21) Appl. No.: 11/881,257

(22) Filed: Jul. 25, 2007

(65) Prior Publication Data

US 2008/0047724 A1 Feb. 28, 2008

(30) Foreign Application Priority Data

Jul. 27, 2006 (DE) ...................... 10 2006 000 375

(51) Int. Cl.
*B25F 5/02* (2006.01)
*B23B 45/16* (2006.01)

(52) U.S. Cl. ..................... 173/162.2; 173/170; 173/211

(58) Field of Classification Search .............. 173/162.1, 173/162.2, 210, 211, 201, 170
See application file for complete search history.

(56) References Cited

U.S. PATENT DOCUMENTS 3,972,119 A * 8/1976 Bailey .......................... 30/381
4,401,167 A * 8/1983 Sekizawa et al. .......... 173/162.1
4,749,049 A * 6/1988 Greppmair ............... 173/162.2
4,800,965 A * 1/1989 Keller ..................... 173/162.2
5,046,566 A * 9/1991 Dorner et al. ............ 173/162.2
5,522,466 A * 6/1996 Harada et al. ............ 173/162.2
5,697,456 A * 12/1997 Radle et al. .............. 173/162.2
5,699,865 A * 12/1997 Forderer et al. .......... 173/162.2
6,076,616 A * 6/2000 Kramp et al. ............ 173/162.2
6,913,088 B2 * 7/2005 Berger ......................... 173/48
7,004,655 B2 * 2/2006 Ferrara .......................... 401/6
7,076,838 B2 * 7/2006 Meixner ...................... 16/431
7,252,156 B2 * 8/2007 Sugiyama et al. ........ 173/162.1
7,287,601 B2 * 10/2007 Hellbach et al. ......... 173/162.2
7,320,369 B2 * 1/2008 Stirm et al. .............. 173/162.2

* cited by examiner

*Primary Examiner*—Scott A. Smith
(74) *Attorney, Agent, or Firm*—Abelman, Frayne & Schwab

(57) ABSTRACT

A hand-held power tool includes a spring-mounted decoupling device (16) for supporting a tool handle (14) on the tool housing (4) and having a first spring-mounted support (18) and a second spring-mounted support (20) that is spaced from the operational axis (A) in a second direction (y) perpendicular to the first direction (z) further away than the first spring-mounted support (18) that has a smaller spring stiffness along the second direction (y) than along the first direction (z).

13 Claims, 8 Drawing Sheets

Fig. 1

HAND-HELD POWER TOOL WITH A DECOUPLING DEVICE

BACKGROUND OF THE INVENTION

1. Field of the Invention

The present invention relates to a hand-held power tool, in particular in form of an electrical combination hammer that can be alternatively used as a hammer drill or a chisel hammer and that includes a housing in which there is provided operational means that reciprocates along an operational axis spaced from the gravity center of the tool and extending parallel to a first direction which corresponds to the operational direction of the tool. E.g., the operational means can be formed as a percussion or impact piston of an electro-pneumatic percussion mechanism. The power tool further includes a handle supported on the housing by a spring-mounted decoupling device for preventing transmission of the housing vibrations to the handle. The decoupling device includes a first spring-mounted support and a second spring-mounted support in form of a pivotal support and that is spaced from the operational axis in a second direction, which is perpendicular to the first, operational direction, by a distance greater than the distance the first support is spaced from the operational axis in the second direction.

2. Description of the Prior Art

In hand-held power tools of the type described above, during an operation, the housing is subjected to rotational oscillations which result from the operational axis being spaced from the tool gravity center. The use of a spring-mounted support, which provides for a certain rotation of the handle relative to the tool housing against a biasing force permits to prevent the transmission of the vibrations which act on the housing as a result of rotational oscillations, to the handle. The device permits to reduce vibrations acting on the handle not only in the first operational direction but also in the second direction, increasing the comfort of a user holding the power tool.

The reduction of the vibrations is effected in all directions by a respective, most possible vibration-decoupled suspension of the handle, which quasi-isolates vibrations produced during an operation. Further, dependent on used spring means, more or less large damping effect is achieved. Below, reduction of the vibrations, which does not depend on the portion of the damping effect, for simplicity sake, will be referred to as decoupling.

German Publication DE 33 12 195 A1 discloses a hand-held power tool in form of a rotary-percussion hammer drill with a handle spring-mounted on the tool housing. Between the handle and the housing, there are provided upper spring-mounted means in the region of the percussion or operational axis and lower spring-mounted means that are formed by a spring-supported pivotal support that is spaced from the operational axis. The lower spring-mounted means has a higher spring stiffness than the upper spring-mounted means.

The known decoupling device should insure a stable guidance by the lower spring-mounted means while simultaneously insuring a high damping effect in the percussion or operational direction by the upper spring-mounted means.

However, the drawback of the known hand-held tool consists in that despite the all-side spring action applied to both spring-mounted means, an adequate decoupling of the handle from rotational oscillations acting on the housing is not possible. Rather, because of the rotational oscillations, the spring behavior of both spring-mounted means is superimposed. Because of the relatively stiff lower spring-mounted means and superimposition of the spring action of the upper spring-mounted means in the second direction, during an operation, relatively high vibrations along the second direction still remains.

Accordingly, an object of the present invention is to provide a hand-held power tool in which the drawbacks of the known power tool are eliminated and vibrations which are produced by rotational oscillations and which are transmittable to the handle, are reduced.

SUMMARY OF THE INVENTION

This and other objects of the present invention, which will become apparent hereinafter, are achieved by providing, in the hand-held power tool, a first spring-mounted support that has a noticeably smaller spring stiffness in the second direction than in the first, operational direction.

With a reduced spring stiffness of the first support in the second direction, the decoupling of the handle from the housing vibrations, which are caused by rotational oscillations about the gravity center, in the second direction is effected to a great extent by the spring action at the second spring-mounted support, and the disadvantageous influence of the spring action of the first spring-mounted support the decoupling of the rotational vibrations is prevented to a most possible extent. Thereby, a particularly effective decoupling of the handle from rotational vibrations of the housing is achieved. This indeed insures a particularly comfortable handling of the power tool during an operation.

According to a particularly advantageous embodiment of the invention, first spring-mounted support has a first housing-side support arrangement fixedly connected with the housing and a first handle-side support arrangement fixedly connected with the handle. A first spring arrangement is located between the first housing-side support arrangement and a first handle-side support arrangement for biasing the first housing-side support arrangement and the first handle-side support arrangement away from each other in the first direction. Compared to that, in the second direction, a permanently free intermediate space is provided between the first housing-side support arrangement and the first hand-side support arrangement to minimize the spring action in the second direction. This insures a particularly good decoupling of the handle from the housing vibrations, which are caused, during operation, by the rotational oscillations of the housing, along the second directions. The large displacement forces, which act in the first direction, can be picked up by the high spring stiffness of the first support.

Preferably, one of the first housing-side support arrangement and the first handle-side support arrangement has a first, bar-shaped support member extending parallel to a third direction perpendicular to both the first direction and the second direction. Further, another of the first housing-side support arrangement and the first handle-side support arrangement has a first tubular support member radially surrounding the first, bar-shaped support member. The one of the first housing-side support arrangement and the first handle-side support arrangement is supported in the first direction by a first side of the first bar-shaped support member lying permanently against the first tubular support member, with interposition of a first spring arrangement therebetween. A second opposite side of the first bar-shaped support member can be placed against the first tubular support member and can be displaceable therefrom, dependent on the pressure applied to the handle. This permits to achieve a good vibration isolation in the first direction, e.g., when a pressure force, which is required during operation of a percussion mechanism, is applied to the handle. On the other hand, upon application of a negative force, i.e, upon application of the tensioning force to the handle, a direct action of the handle on the remaining portion of the power tool is insured in order, e.g., to apply a direct as possible force for releasing the working tool when the later becomes jammed.

Advantageously, the spring arrangement includes a first elastomeric arrangement having, with respect to the first side of the first bar-shaped support member, a preloaded region and, with respect to the second side of the first bar-shaped support member, a stop region. The preload region has, in the first direction, an extension that is several times greater than an extension of the stop region. The elastomeric arrangement is spaced, with respect to the first and second sides of the first bar-shaped support member, in the second direction by a permanent distance from the first tubular support member.

The elastomeric arrangement can be formed, e.g., of a foamed plastic material, in particular, polyurethane. Thereby, a particularly favorable spring action at the preloaded region can be achieved, which insures a good decoupling and, thereby, a noticeable reduction of the vibrations transmitted to the handle.

Thereby, also, a higher spring stiffness can be insured upon application of an increasing pressure force to the preloaded region, which is formed of the foamed elastomer. This enables a good guidance of the power tool even at an increased load. The permanent distance, by which the elastomeric arrangement is spaced, in the second direction, from the first tubular support member, with respect to the opposite sides of the bar-shaped member, insures that no essential spring action takes place in the second direction. Simply, a certain spring action would take place along the second direction over the cross-section of the preloaded region that extends in the first direction. However, this action in the second direction is noticeably smaller because of the spring stiffness in the first direction.

Advantageously, the first elastomeric arrangement has a first support region having, in the first direction, a smaller extension than the preloaded region. Thereby, a purposeful progression of the spring stiffness of the first spring arrangement can be achieved at a predetermined displacement of the handle relative to the housing. This can prevent a damaging contact between the handle and the housing even at a large pressure force.

Further, the second spring-mounted support has a greater spring stiffness in the second direction than the first spring-mounted support. Thereby, the decoupling of the handle from the housing vibrations, which were caused by rotational oscillations of the housing about the gravity center, is effected in the second direction exclusively by the spring action at the second support, without superimposition of the spring action of the first spring-mounted support.

Advantageously, the second spring-mounted support has a second bar-shaped support member radially surrounded by a second tubular support member with interposition of a second elastomeric arrangement therebetween, with the second elastomeric arrangement having a region with a star-shaped cross-section. Such an elastomeric arrangement permits to set particularly good a predetermined spring stiffness that acts uniformly in the radial direction about the second bar-shaped member. In addition, this permits to produce a relatively small spring action in the rotational direction about the second bar-shaped support member. Altogether, thereby, a particularly good decoupling of the handle from the housing vibrations, which are caused by the rotational oscillations of the housing, is achieved.

It is particularly advantageous when the second elastomeric arrangement has, between the second bar-shaped support member and the second tubular support member, a second support region having circumferentially a smaller radial extension than the region with the star-shaped cross-section. Thereby, at the second spring-mounted support arrangements, with a certain relative displacement of the handle relative to the housing in a radial direction of the second bar-shaped support member, a purposeful progression of the spring stiffness of the second elastomeric arrangement is achieved. The additional increase of the spring characteristic by provision of the second support region can be obtained by forming it with a special shape, e.g., by a predetermined cross-sectional shape, by a variable thickness, or by a predetermined length. In each case, a damaging contact between the handle and the housing can be prevented upon application of a high pressure force or when loosening the jammed working tool also at the second spring-mounted support.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
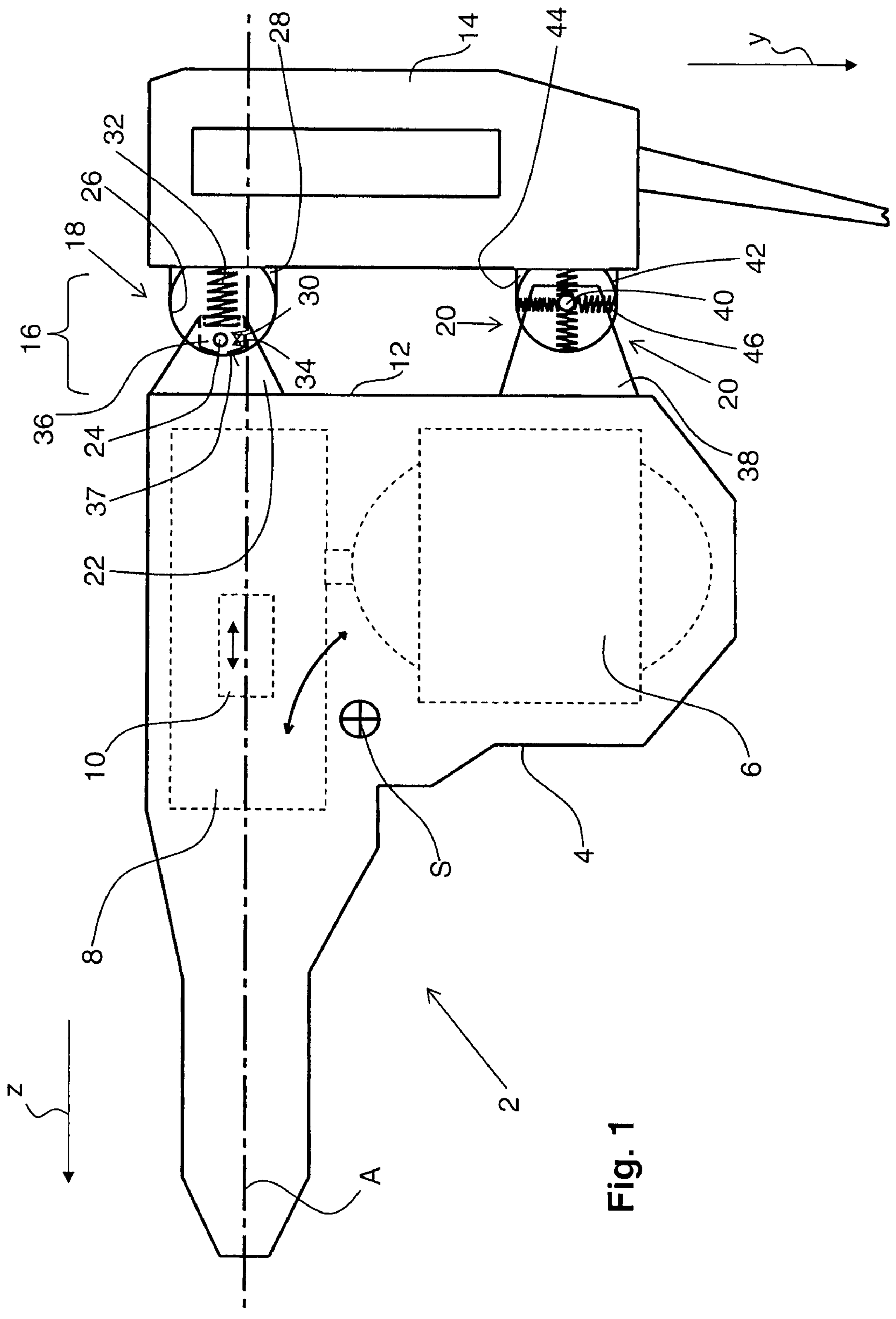
FIG. 1 a principal schematic view of a hand-held power tool according to the present invention.

FIG. 1 shows a principal schematic view of a hand-held power tool 2 according to the present invention and which is formed as an electrical combination hammer that can be alternatively used as a hammer drill or chisel hammer. The power tool 2 has a housing 4 in which a drive motor 6 and an electro-pneumatic drive unit 8, e.g., a percussion mechanism which is driven by the electric motor 6, are located. The drive unit 8 includes a gear unit and operating means 10, e.g., in form of a percussion or impact piston that reciprocates during an operation along an operational axis A which determines a parallel first direction z that corresponds to the operational direction of the hand-held power tool 2. The operational axis A is spaced from the gravity center S of the hand-held power tool 2 which, e.g., can be defined by the gravity center of the mass of the hand-held power tool 2 in a middle position of the operational means 10.

At the rear side 12 of the housing 4, a handle 14 is held which extends essentially along a second direction y perpendicular to the first direction z. The handle 14 is connected with the housing 4 by a spring-mounted decoupling device generally designated with a reference numeral 16. The decoupling device 16 has a first spring-mounted support 18 that is located adjacent to the operational axis A, and a second spring-mounted support 20 in form of a pivot support which, with reference to the second direction y, is spaced further from the operational axis A than the first spring-mounted support.

The first spring-mounted support 18 has a first housing-side support arrangement 22 with a first bar-shaped support member 24 which is surrounded by a first tubular support member 26 of a first handle-side support arrangement 28. Alternatively, instead of forming the handle-side support arrangement 28 in tubular form, another circumferential form can be used. The first bar-shaped member 24 is supported at its first side 30 against the first tubular member 26 in the first direction z by a first spring arrangement 32 which is shown schematically by a spiral spring but can, however, be formed by any other suitable spring means. At its second side 34 which is opposite the first side 30, the bar-shaped support member 24 is supported, in a non-loaded condition of the hand-held power tool 2 shown in FIG. 1, on the tubular support member 26 by a stop 37 formed as a shaped part 36.

The second spring-mounted support 20 has a second housing-side support arrangement 38 with a second bar-shaped support member 40 that is surrounded by a second tubular support member 42 of a second handle-side support arrangement 44. The second bar-shaped support member 40 is supported against the second tubular support member 42 circumferentially in a radial direction by a second spring arrangement 46 which is shown schematically by four spiral springs but can, however, be formed by other suitable spring means.

Figure 2:
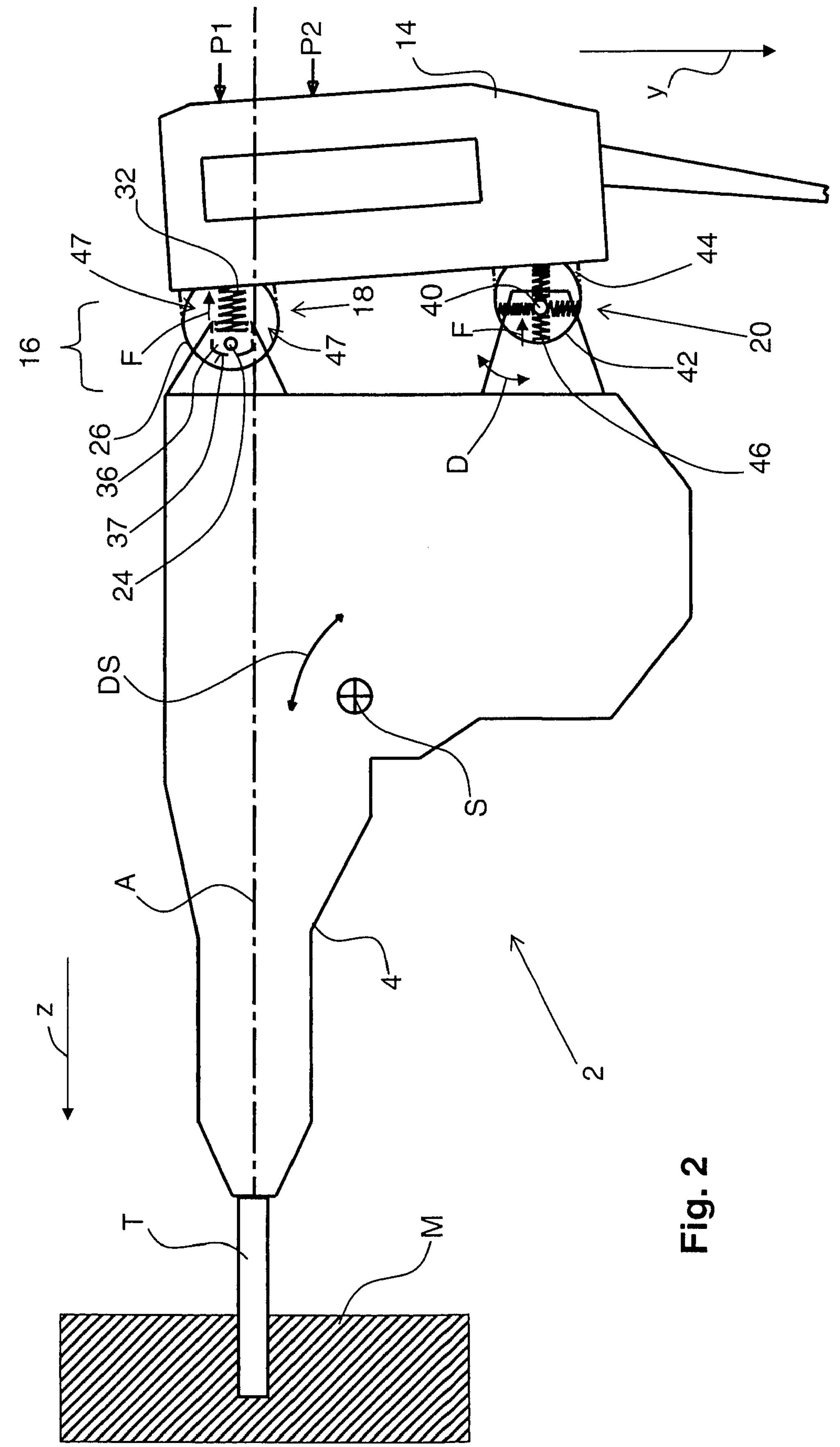
FIG. 2 a schematic view of the hand-held power tool shown in FIG. 1 with a press-on force applied thereto.

FIG. 2 shows the hand-held power tool 2 in an operating condition. In the operating condition, pressure P1, P2 is applied to the handle 14, whereby the hand-held power tool 2 is pressed through the working tool T against a treated material M. Upon application of pressure P1, P2, the handle 14, together with both tubular support members 26, 42, is displaced in the first direction z toward the housing 4 against a biasing force of both spring arrangement 32, 46.

As a result of displacement of the handle 14 toward the housing 4, the stop 37, which is formed by the shaped part 36 that is supported on the first bar-shaped support member 24, becomes spaced from the first tubular support member 26. Thereby, the first bar-shaped support member 24 can freely pivot relative to the first tubular support member 26 in the first direction z under the action of the spring arrangement 32.

In the second direction y, the first bar-shaped support member 24 or the shaped part 36, which is supported thereon, has both of its sides permanently spaced, respectively, from the first tubular support member 26 at all forces applied thereto during the predetermined operation of the hand-held power tool 2. Because of the existence, with respect to the second direction y, permanent intermediate spaces 47 on both sides of the bar-shaped support member 24, the spring action of the first spring arrangement 32 in the second direction y is reduced to a minimum. Therefore, the first spring-mounted support 18 has a smaller spring stiffness along the second direction y than along the first direction z.

In the second spring-mounted support 20, the second bar-shaped support member 40 is supported against the second tubular support member 42 radially with respect to all sides by the second spring arrangement 46. Therefore, in the second direction y, the spring permanent of the second spring-mounted support 20 is higher than the spring permanent of the first spring-mounted support 18.

Further, the construction of the pivot support, which forms the second support 20, provides for a spring action in a rotational direction D about the second bar-shaped support member 40. Therefore, the second bar-shaped support member 40 can freely pivot relative to the second tubular support member 42 in the first direction z, the second direction y, and the rotational direction D under the spring action of the second spring arrangement 46. Thereby a damaging superimposition, which is caused by the spring action of the first spring-mounted support 18, in the second direction y is eliminated.

With this principal construction of the decoupling device 16, the handle 14 can be effectively decoupled in all directions from rotational oscillations in direction shown with arrow DS to which the housing 4 is subjected as a result of the tool gravity center S being space from the operational axis A.

Figure 3:
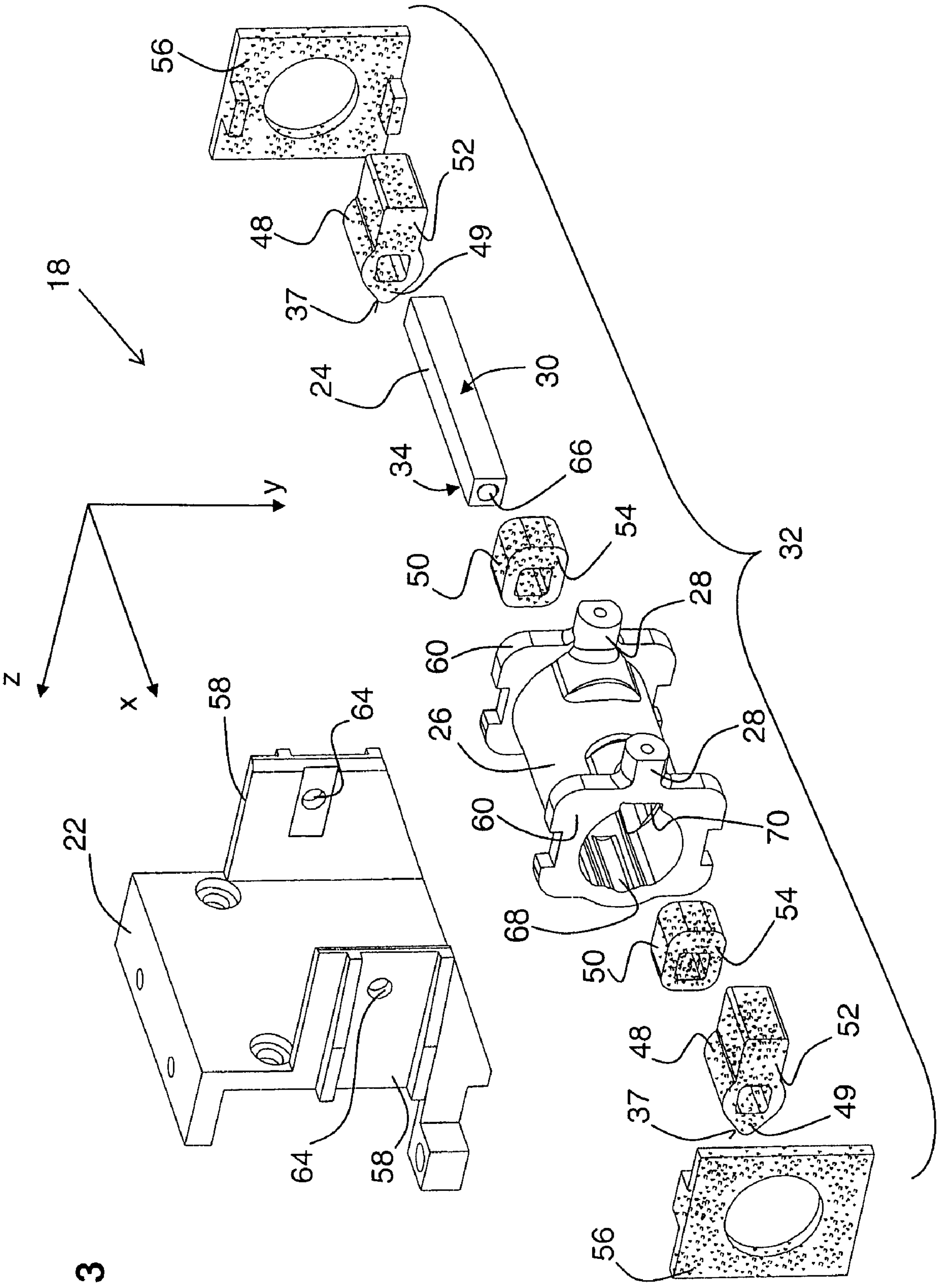
FIG. 3 a perspective exploded view of a preferred embodiment of a first spring-mounted support for supporting the tool handle on the tool housing.
Figure 4:
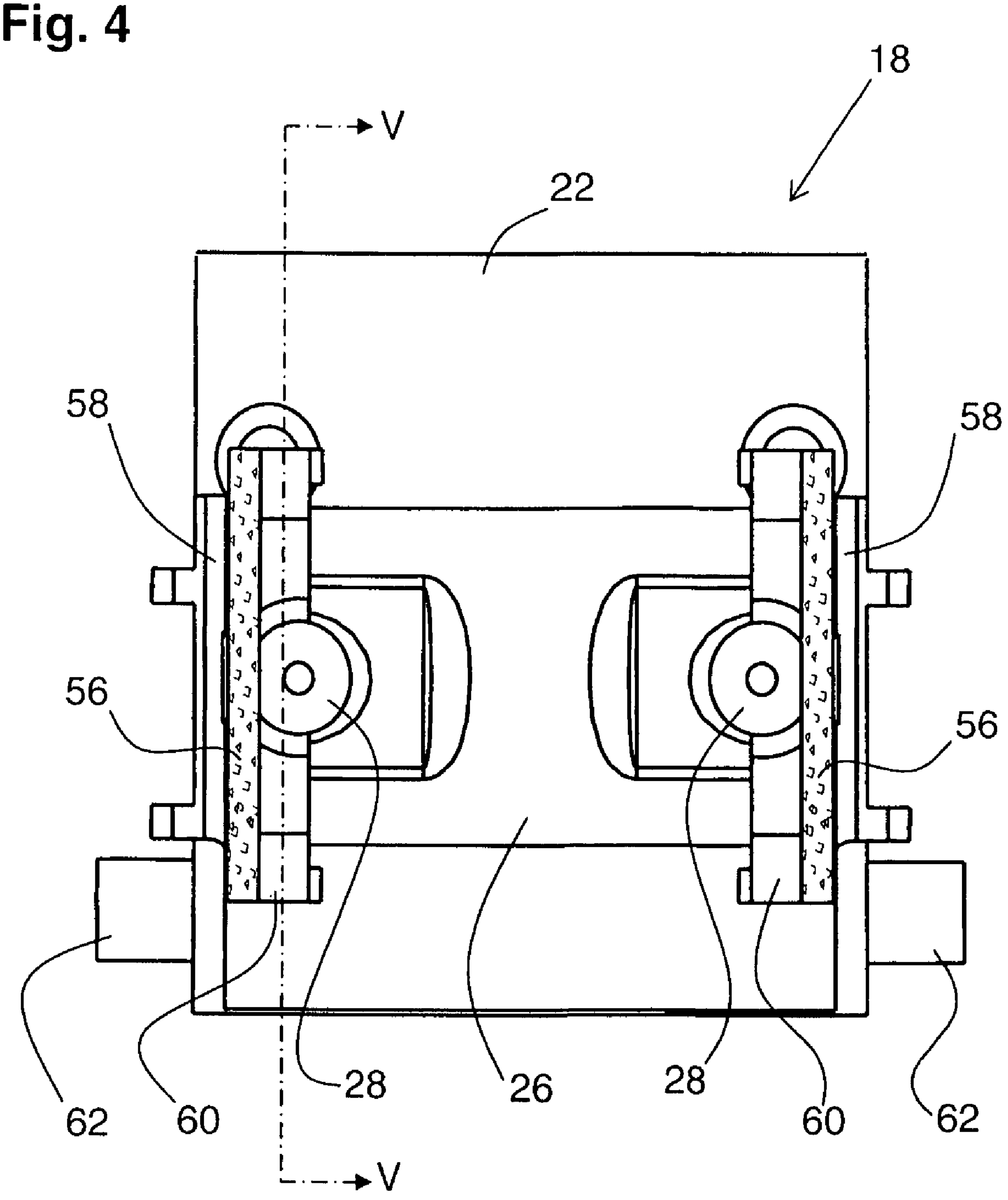
FIG. 4 a side view of the first spring mounted support shown in FIG. 3 in a pre-mounted condition in a first direction z.
Figure 5:
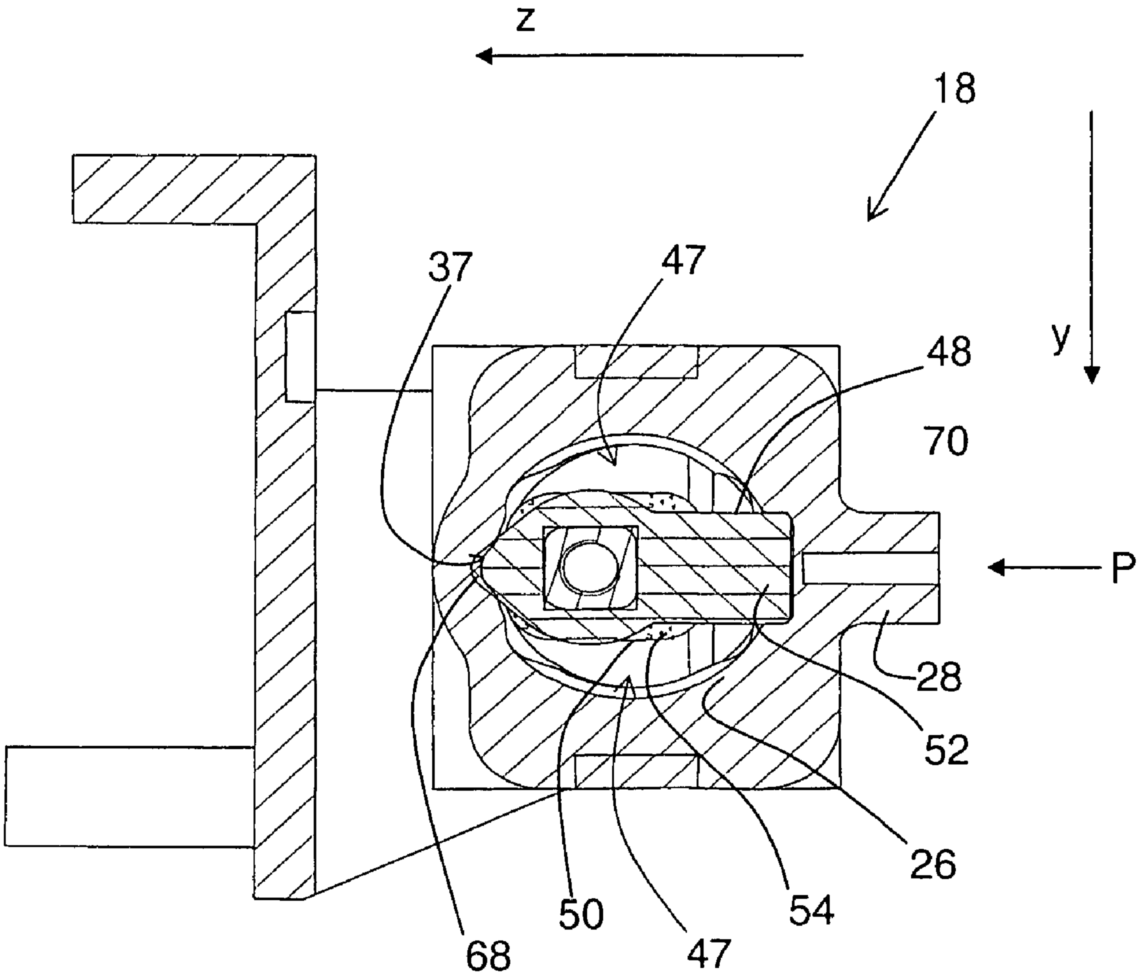
FIG. 5 a cross-sectional view along line V-V in FIG. 4.

FIGS. 3-5 show a particularly advantageous embodiment of the first spring-mounted support 18. In this embodiment, the first spring arrangement 32 is formed by an elastomeric element formed of foamed polyurethane. The spring arrangement 32 is formed of several parts and has two substantially anvil-shaped elastomeric bodies 48 and two collar-shaped elastomeric bodies 50 provided therebetween, which are pushed over the first bar-shaped support member 24 aligned parallel to a third direction x that extends perpendicular to both the first direction z and the second direction y.

The anvil-shaped elastomeric bodies 48 have, in the first direction z, on the first side 30 of the first bar-shaped support member 24, a preloaded region 52 that extends further in the first direction z than the support region 54 of the two collar-shaped elastomeric bodies 50 likewise provided on the first side 30 of the first bar-shaped support member 24. On the second side 34 of the first bar-shaped support member 24, the two anvil-shaped elastomeric bodies 48 form a pointed stop region 49. The stop region 49 extends in the first direction z by an amount that amounts simply to a fraction of the extension of the preloaded region 52 in the first direction z. In this way, only a relatively weak spring action of the preloaded region 52 in the operational direction of the hand-held power tool 2 is produced, whereas in the opposite direction, a relatively hard contact between the first bar-shaped support member 24 and the first tubular support member 26 through the stop region 29 is produced. Thereby, upon pulling of the handle 14, a relatively direct force transmission to the housing 4, which is advantageous, can take place, e.g. in order to separate the working tool T from the treated material M in case of a jam.

There are further provided two end-side elastomeric bodies 56 which are located between a side member 58 of the first housing-side support arrangement 22 and an end flange 60 of the first tubular support member 26. The end-side elastomeric bodies 56 insure, during an operation, reduction of vibrations in the third direction x by at least partial decoupling of the first handle-side support arrangement 28 from the first housing-side support arrangement 22.

As shown in FIG. 4, the first spring-mounted support 18 can be completely pre-assembled with two fastening elements 62. The fastening elements 62 extend through respective bores 64 in the side member 58 and are secured in a longitudinal bore 66 in the first bar-shaped support member 24, as can be seen in FIG. 3.

FIG. 5 shows the spring-mounted support 18 in an unloaded initial position of the hand-held power tool shown in FIG. 1. In the position shown in FIG. 5, the pointed stop 37 is located in a receiving groove 68 of the first tubular support member 26, and the preloaded region 52 is located in a support groove 70 of the first tubular support member 26.

Thereby, in a non-actuated condition of the hand-held power tool 2, a certain fixing of the first bar-shaped support member 24 relative to the first tubular support member 26 in the second direction y is achieved. In general, the anvil-shaped elastomeric body 48 forms, together with a first tubular support member 26, at opposite sides in the second direction, two intermediate spaces 47, respectively.

Upon application, during an operation, of pressure forces P1, P2 according to FIG. 2 to the handle 14 and, therefore, to the first handle-side support arrangement 28, the stop 37 become displaced in the first direction z from the receiving groove 68. Simultaneously, the intermediate spaces 47 assume a reduced volume which is maintained permanently during the operation, even if recurrently. Thus, in the second direction y, a smaller spring action can still be obtained with the preloaded region 52 that remains pressed against the support groove 70.

When a particularly large pressure force P1, P2 is applied, the preloaded region 52 can be compressed to such an extent that the first tubular support member 26 engages, in the first direction z, the support region 54 of the collar-shaped elastomeric body 50. With this, the spring stiffness of the first spring arrangement 32 is purposefully increased.

Figure 6:
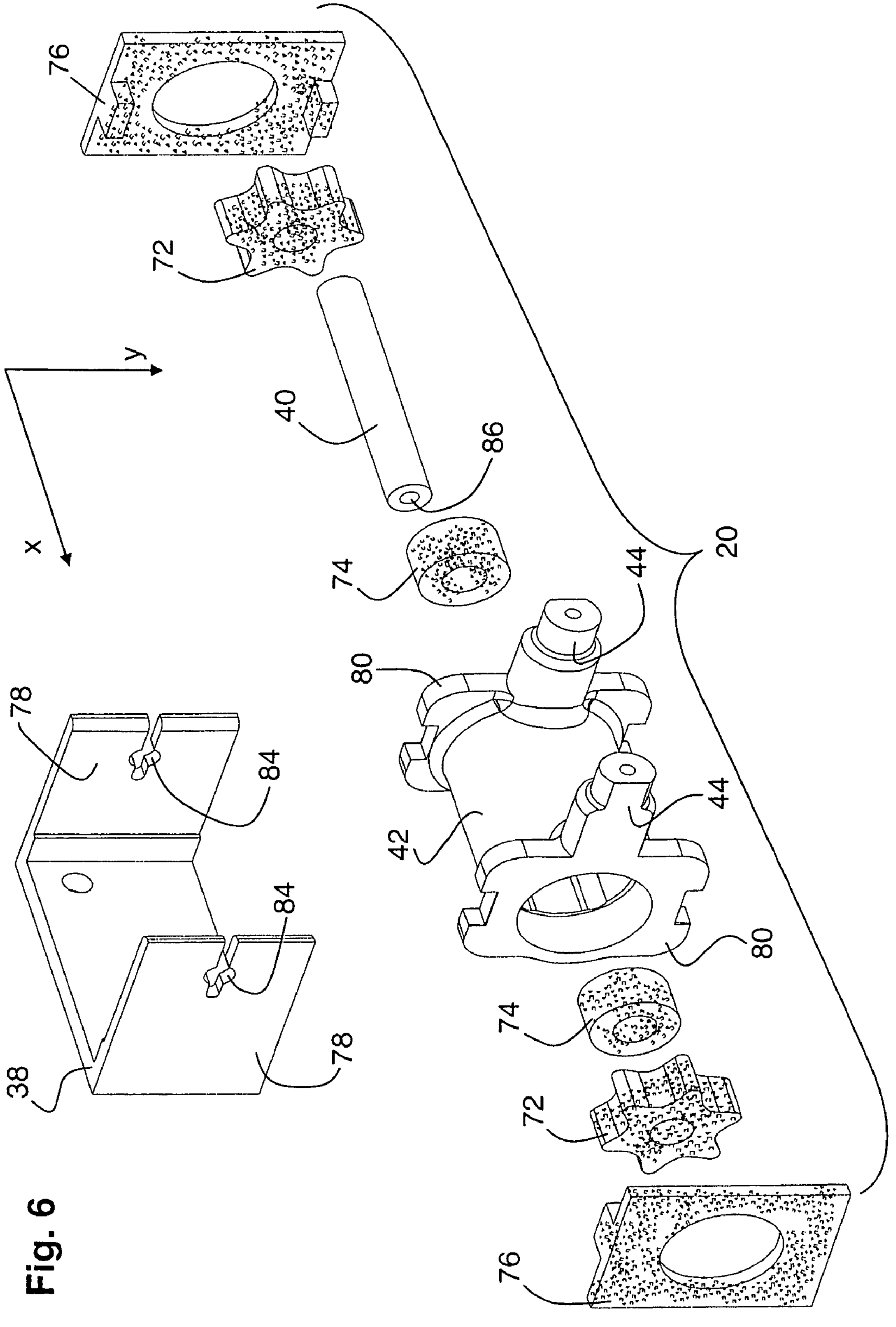
FIG. 6 a perspective exploded view of a preferred embodiment of a second spring-mounted support for supporting the tool handle on the tool housing.
Figure 7:
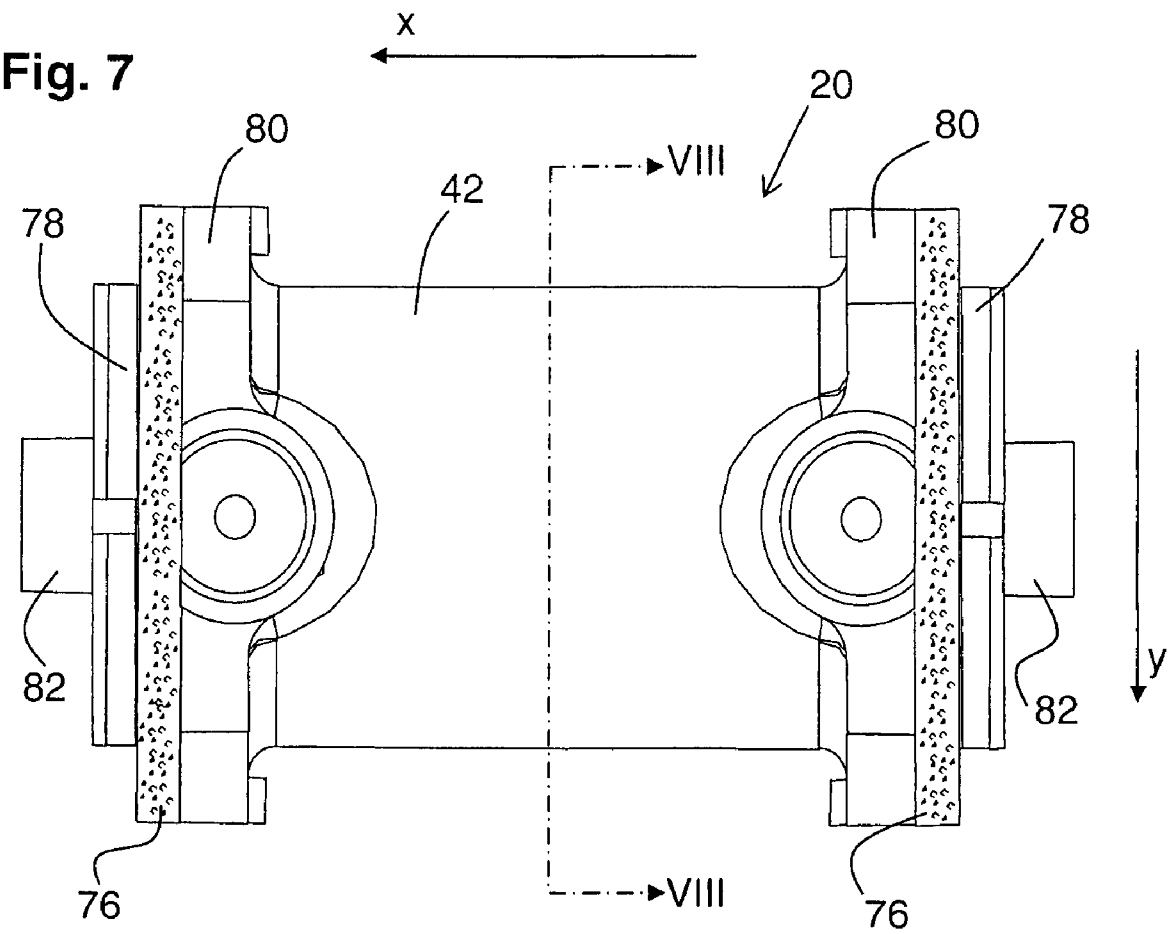
FIG. 7 a side view of the second spring mounted support shown in FIG. 6 in a pre-mounted condition in a first direction z.
Figure 8:
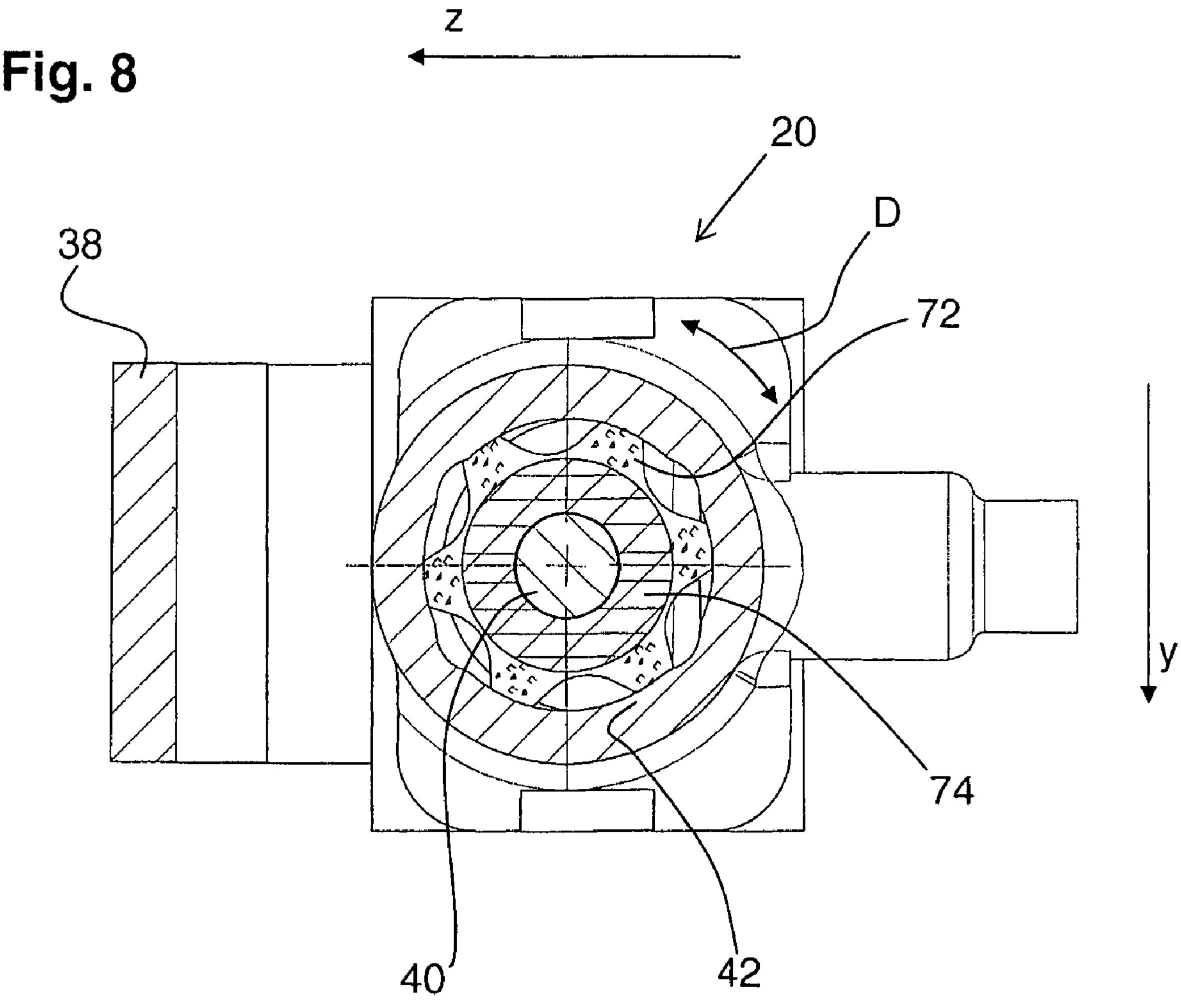
FIG. 8 a cross-sectional view along line VIII-VIII in FIG. 7.

FIGS. 6-8 show a particularly advantageous embodiment of the second spring-mounted support 20 that, as it has already been mentioned above, is formed as a pivotal support. In the support 20, the second spring arrangement 46 is likewise substantially formed by an elastomeric arrangement of foamed polyurethane. The second spring arrangement 46 is formed of several parts and has two, essentially star-shaped, elastomeric bodies 72 and two annular elastomeric bodies 74 located therebetween, with all four bodies being pushed over the second bar-shaped support member 40 that is aligned parallel to the third direction x.

The star-shaped bodies 72 extend in the radial direction about the second bar-shaped support member 40 and further than the two annular elastomeric bodies 74.

In the support 20, there are further provided two end-side elastomeric bodies 76 which are, in the mounted condition, are located, respectively, between side members 78 of the second housing-side support arrangement 38 and end-side flanges 80 of the second tubular support member 42. The end-side elastomeric bodies 76 insure, during an operation, reduction of vibrations in the third direction x by at least partial decoupling of the second handle-side support arrangement 44 from the second housing-side support arrangement 38.

As shown in FIG. 7, the second spring mounted support 20 can be completely pre-assembled with two fastening elements 82. The fastening elements 82 extend through respective bores 84 in the side members 78 and are secured in a longitudinal bore 86 in the second bar-shaped support member 40, as can be seen in FIG. 6.

FIG. 8 shows the second spring-mounted support 20 in an unloaded initial position of the hand-held power tool shown in FIG. 1. During the operation, the star-shaped elastomeric bodies 72, which surround the second bar-shaped support member 40, have a substantially same spring stiffness in all of the radial directions and which is greater than the spring stiffness of the first spring-mounted support 18 in the second direction y at the stop 37 spaced from the first tubular support member 26.

When a particular high load is applied in a radial direction, the star-shaped elastomeric bodies 72 can be compressed to such an extent that the second tubular support member 42 engages, in the corresponding direction, the annular elastomeric bodies 74, respectively, which serve as second support regions. Thereby the spring stiffness of the second spring arrangement 46 purposefully, progressively increases. In addition, the second spring mounted support 20 provides a certain spring action in the rotational direction D, which action provides for decoupling of the handle 14 with respect to the rotational movement of the housing 4.

Besides the shown multi-part formation of spring arrangements 32, 46 which are formed as elastomeric arrangements, several of elastomeric bodies 48, 50, 56 and 72, 74, 76 can be formed, respectively, as a one-piece part. In addition, the second spring arrangement 46 can be formed, besides being formed of elastomeric bodies, as shown in the drawings, by a plate spring that, however, must provide the same degrees of freedom in all of the three directions x, y and z.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held power tool, comprising:

a housing (4);

operational means (10) provided in the housing (4) and reciprocating, during an operation, along an operational axis (A) extending parallel to a first direction (z);

a handle (14); and a spring-mounted decoupling device (16) for supporting the handle (14) on the housing (4) and having:

a first spring-mounted support (18) with a first spring; and a second spring-mounted support (20) with a second spring that is spaced from the operational axis (A) in a second direction (y) perpendicular to the first direction (z) further away than the first support arrangement (18), wherein the second spring is shorter in length than the first spring;

wherein the second spring has a greater spring stiffness than the first spring; and wherein the first spring of the first spring-mounted support (18) has a smaller spring stiffness along the second direction (y) than along the first direction (z).

2. A hand-held power tool according to claim 1, wherein the first spring-mounted support (18) has a first housing-side support arrangement (22) fixedly connected with the housing (4), a first handle-side support arrangement (28) fixedly connected with the handle (14), and a first spring arrangement (32) including the first spring located between the first housing-side support arrangement (22) and the first handle-side support arrangement (28) for biasing the first housing-side support arrangement (22) and the first handle-side support arrangement (28) away from each other in the first direction (z), and wherein an intermediate space (47) is provided between the first housing side support arrangement (22) and the first handle-side support arrangement (28) in the second direction (y).

3. A hand-held power tool according to claim 2, wherein one of the first housing-side support arrangement (22) and the first handle-side support arrangement (28) has a first bar-shaped support member (24) extending parallel to a third direction (x) perpendicular to the first direction (z) and the second direction (y), and another of the first housing-side support arrangement (22) and the first handle-side support arrangement (28) has a first tubular support member (26) radially surrounding the first bar-shaped support member (24), and wherein the one of the first housing-side support arrangement (22) and the first handle-side support arrangement (28) is supported in the first direction (z) with a first side (30) of the first bar-shaped support member (24) lying permanently against the first tubular support member (26) and with a second opposite side (34) of the first bar-shaped support member (24) being placeable against the first tubular support member (26) and being displaceable therefrom, with interposition of the first spring arrangement (32) between the first bar-shaped support member (24) and the first tubular support member (26).

4. A hand-held power tool according to claim 3, wherein the first spring arrangement (32) comprises a first elastomeric arrangement having, with respect to the first side (30) of the first bar-shaped support member (24), a preloaded region and, with respect to the second side (34) of the first bar-shaped support member, a stop region (49), the preload region having, in the first direction (z), an extension that is several times greater than an extension of the stop region (49), the elastomeric arrangement being spaced, with respect to the first and second sides (30, 34) of the first bar-shaped support member (24), in the second direction (y) by a permanent distance from the first tubular support member (26).

5. A hand-held power tool according to claim 4, wherein the first elastomeric arrangement has a first support region (54) having, in the first direction (z), a smaller extension than the preloaded region (52).

6. A hand-held power tool according to claim 4, wherein the second spring-mounted support (20) has a greater spring stiffness in the second direction (y) than the first spring-mounted support (18); and wherein the second spring-mounted support (20) has a second bar-shaped support member (40) radially surrounded by a second tubular support member (42) with interposition of a second elastomeric arrangement therebetween, the second elastomeric arrangement having a region with a star-shaped cross-section.

7. A hand-held power tool according to claim 6, wherein the second elastomeric arrangement has, between the second bar shaped support member (40) and the second tubular support member (42), a second support region having circumferentially a smaller radial extension than the region with the star-shaped cross-section.

8. A hand-held power tool according to claim 1, wherein the second spring-mounted support (20) has a greater spring stiffness in the second direction (y) than the spring stiffness in the second direction (y) of the first spring-mounted support (18).

9. A hand-held power tool, comprising:

a housing (4);

operational means (10) provided in the housing (4) and reciprocating, during an operation, along an operational axis (A) extending parallel to a first direction (z);

a handle (14); and a spring-mounted decoupling device (16) for supporting the handle (14) on the housing (4) and having a first spring-mounted support (18) and a second spring-mounted support (20) that is spaced from the operational axis (A) in a second direction (y) perpendicular to the first direction (z) further away than the first support arrangement (18), the first spring-mounted support (18) having a smaller spring stiffness along the second direction (y) than along the first direction (z);

wherein the first spring-mounted support (18) has a first housing-side support arrangement (22) fixedly connected with the housing (4), a first handle-side support arrangement (28) fixedly connected with the handle (14), and a first spring arrangement (32) located between the first housing-side support arrangement (22) and the first handle-side support arrangement (28) for biasing the first housing-side support arrangement (22) and the first handle-side support arrangement (28) away from each other in the first direction (z), and wherein an intermediate space (47) is provided between the first housing side support arrangement (22) and the first handle-side support arrangement (28) in the second direction (y);

wherein one of the first housing-side support arrangement (22) and the first handle-side support arrangement (28) has a first bar-shaped support member (24) extending parallel to a third direction (x) perpendicular to the first direction (z) and the second direction (y), and another of the first housing-side support arrangement (22) and the first handle-side support arrangement (28) has a first tubular support member (26) radially surrounding the first bar-shaped support member (24), and wherein the one of the first housing-side support arrangement (22) and the first handle-side support arrangement (28) is supported in the first direction (z) with a first side (30) of the first bar-shaped support member (24) lying permanently against the first tubular support member (26) and with a second opposite side (34) of the first bar-shaped support member (24) being placeable against the first tubular support member (26) and being displaceable therefrom, with interposition of the first spring arrangement (32) between the first bar-shaped support member (24) and the first tubular support member (26).

10. A hand-held power tool according to claim 9, wherein the first spring arrangement (32) comprises a first elastomeric arrangement having, with respect to the first side (30) of the first bar-shaped support member (24), a preloaded region and, with respect to the second side (34) of the first bar-shaped support member, a stop region (49), the preload region having, in the first direction (z), an extension that is several times greater than an extension of the stop region (49), the elastomeric arrangement being spaced, with respect to the first and second sides (30, 34) of the first bar-shaped support member (24), in the second direction (y) by a permanent distance from the first tubular support member (26).

11. A hand-held power tool according to claim 10, wherein the first elastomeric arrangement has a first support region (54) having, in the first direction (z), a smaller extension than the preloaded region (52).

12. A hand-held power tool according to claim 10, wherein the second spring-mounted support (20) has a greater spring stiffness in the second direction (y) than the first spring-mounted support (18); and wherein the second spring-mounted support (20) has a second bar-shaped support member (40) radially surrounded by a second tubular support member (42) with interposition of a second elastomeric arrangement therebetween, the second elastomeric arrangement having a region with a star-shaped cross-section.

13. A hand-held power tool according to claim 12, wherein the second elastomeric arrangement has, between the second bar shaped support member (40) and the second tubular support member (42), a second support region having circumferentially a smaller radial extension than the region with the star-shaped cross-section.

* * * * *